United States Patent
Miller et al.

(10) Patent No.: US 11,520,692 B1
(45) Date of Patent: Dec. 6, 2022

(54) PERFORMING SOFTWARE TESTING WITH BEST POSSIBLE USER EXPERIENCE

(71) Applicant: International Business Machines Corporation, Armonk, NY (US)

(72) Inventors: Grant Douglas Miller, Arvada, CO (US); Alan Chung, Hopewell Junction, NY (US); Jeremy R. Fox, Georgetown, TX (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/469,764

(22) Filed: Sep. 8, 2021

(51) Int. Cl.
 *G06F 9/44* (2018.01)
 *G06F 11/36* (2006.01)
 *G06F 11/34* (2006.01)

(52) U.S. Cl.
 CPC ...... *G06F 11/3688* (2013.01); *G06F 11/3438* (2013.01); *G06F 11/3476* (2013.01)

(58) Field of Classification Search
 None
 See application file for complete search history.

(56) References Cited

U.S. PATENT DOCUMENTS

| 8,438,060 | B2 | 5/2013 | Symons et al. | |
|---|---|---|---|---|
| 9,042,311 | B2 | 5/2015 | Zhu | |
| 10,365,914 | B2* | 7/2019 | DeMaris | G06F 8/71 |
| 10,489,007 | B2* | 11/2019 | Vaglio | G06F 3/0481 |
| 2006/0026268 | A1* | 2/2006 | Sanda | G06F 9/5011 |
| | | | | 709/224 |
| 2016/0371177 | A1 | 12/2016 | Aiello et al. | |
| 2019/0179953 | A1* | 6/2019 | Kline | G06F 16/335 |
| 2020/0159651 | A1* | 5/2020 | Myers | G06F 11/3664 |
| 2020/0327043 | A1* | 10/2020 | Dyavappa | G06F 11/3688 |

FOREIGN PATENT DOCUMENTS

| CN | 103475951 A | 12/2013 |
|---|---|---|
| CN | 108390775 A | 8/2018 |

* cited by examiner

*Primary Examiner* — Qamrun Nahar
(74) *Attorney, Agent, or Firm* — Robert A. Voigt, Jr.

(57) ABSTRACT

A computer-implemented method, system and computer program product for testing a software application. User interactions with the functional and non-functional aspects of software applications are monitored. User experience profiles are then generated for the monitored users based on the monitored interactions. The best user experiences in connection with interacting with specific functional and non-functional aspects of the software applications are then identified based on the generated user experience profiles. Virtual users having different types of best user experiences in connection with interacting with different functional and non-functional aspects of the software applications are created. The software application is then tested using the virtual users to determine if the functional and non-functional aspects of the software application satisfy the best user experiences associated with the virtual users. A message may be generated indicating which functional and/or non-functional aspects of the software application did not satisfy a virtual user's best user experience.

20 Claims, 5 Drawing Sheets

PERFORMING SOFTWARE TESTING WITH BEST POSSIBLE USER EXPERIENCE

TECHNICAL FIELD

The present disclosure relates generally to software testing, and more particularly to performing software testing with the best possible user experience, such as during the testing stage of the software product development process prior to being deployed in production.

BACKGROUND

Software testing, such as during the testing stage of the software product development process, is an investigation conducted to provide stakeholders with information about the quality of the software product or service under test. Software testing can also provide an objective, independent view of the software to allow the business to appreciate and understand the risks of software implementation. Test techniques include the process of executing a program or application with the intent of finding failures and verifying that the software product is fit for use.

SUMMARY

In one embodiment of the present disclosure, a computer-implemented method for testing a software application comprises monitoring users interacting with functional and non-functional aspects of software applications. The method further comprises generating user experience profiles for the monitored users based on the monitored interactions. The method additionally comprises identifying best user experiences in connection with interacting with specific functional and non-functional aspects of the software applications based on the generated user experience profiles. Furthermore, the method comprises creating virtual users having different types of best user experiences, which are obtained from the identified best user experiences, in connection with interacting with different functional and non-functional aspects of the software applications. Additionally, the method comprises performing testing of the software application using the virtual users to determine if functional and non-functional aspects of the software application satisfy the best user experiences associated with the virtual users.

Other forms of the embodiment of the computer-implemented method described above are in a system and in a computer program product.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which.

DETAILED DESCRIPTION

As stated in the Background section, software testing, such as during the testing stage of the software product development process, is an investigation conducted to provide stakeholders with information about the quality of the software product or service under test. Software testing can also provide an objective, independent view of the software to allow the business to appreciate and understand the risks of software implementation. Test techniques include the process of executing a program or application with the intent of finding failures and verifying that the software product is fit for use.

Software testing involves the execution of a software component or system component to evaluate one or more properties of interest. In general, these properties indicate the extent to which the component or system under test: meets the requirements that guided its design and development, responds correctly to all kinds of inputs, performs its functions within an acceptable time, is sufficiently usable, can be installed and run in its intended environments and achieves the general result its stakeholders desire.

However, such software testing fails to quantify the users' best experiences with the functional and non-functional aspects of the software application under test. For example, when a user gets a drop-down list populated within a millisecond, the user may expect such an experience in populating another drop-down list in the same or in a different application.

By not testing software applications to determine if the functional and non-functional aspects of the software application satisfy the users' best experiences, such software applications may not be well received by the targeted users despite performing well during the testing stage of the software product development process due to the poor user experience of the software application.

Unfortunately, there is not currently a means for testing software applications with the users' best experiences in connection with the functional and non-functional aspects of the software application under test.

The embodiments of the present disclosure provide a means for performing software testing that includes testing the software application to determine if it satisfies the users' best experiences with respect to the functional and non-functional aspects of the software application under test.

In some embodiments of the present disclosure, the present disclosure comprises a computer-implemented method, system and computer program product for testing a software application. In one embodiment of the present disclosure, user interactions with the functional and non-functional aspects of the software applications are monitored. "Functional" aspects of the software applications, as used herein, refer to the requirements that the software must perform. For example, such functional aspects may include the following types of requirements: transaction handling, business rules, certification requirements, reporting requirements, administrative functions, authorization levels, audit tracking, external interfaces, etc. "Non-functional" aspects of the software applications, as used herein, specify how the software application achieves such requirements. For example, the non-functional aspects specify quality attributes of the software, scalability, capacity, maintainability, performance (e.g., response time), portability, security, availability, reliability, recoverability, serviceability, etc. User experience profiles are then generated for the monitored users based on the monitored interactions. A "user experience" profile, as used herein, refers to a profile that includes data pertaining to a user's perception of utility, ease of use and efficiency in interacting with the functional and non-functional aspects of the software applications. For example, such data may include the user's experience in connection with interacting with a window, a menu, an icon, a widget, a table, a cursor, a pointer, an insertion point, etc. The best user experiences in connection with interacting with specific functional and non-functional aspects of the software applications are then identified based on these generated user experience profiles. For example, out of the generated user experience profiles, it may be determined that a drop-down menu of ten entries was populated at the fastest time of 1 millisecond. As a result, it may be deemed that the best user experience corresponds to populating a drop-down menu of ten entries at 1 millisecond. A "best user experience," as used herein, refers to the most effective or desirable interaction with a functional or non-functional aspect of the software application, such as undergoing an interaction with a functional or non-functional aspect of the software application in the least amount of time. Virtual users having different types of best user experiences (obtained from the identified best user experiences) in connection with interacting with different functional and non-functional aspects of the software applications are created. A "virtual user," as used herein, refers to a virtual representation of the user whose best user experience will be represented by the virtual user. "Virtual representation," as used herein, refers to symbolizing a real user via the use of the user's best user experience that will be used to test the software application under test by the virtual user. For example, a virtual user is created to test a software application to determine if the software application satisfies the best user experience in connection with the non-functional aspect of populating a menu of ten items, where such a best user experience is associated with such a created virtual user. The software application is then tested using the virtual users to determine if the functional and non-functional aspects of the software application satisfy the best user experiences associated with the virtual users. If some of the functional or non-functional aspects of the software application did not satisfy the best user experiences associated with the virtual users, then a message may be generated indicating which functional and/or non-functional aspects of the software application under test did not satisfy a virtual user's best user experience. Such a message may be utilized by the software developer to correct such deficiencies. In this manner, software applications may be tested to determine if the software applications satisfy the users' best experiences with respect to the functional and non-functional aspects of the software application under test.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill the relevant art.

Figure 1:
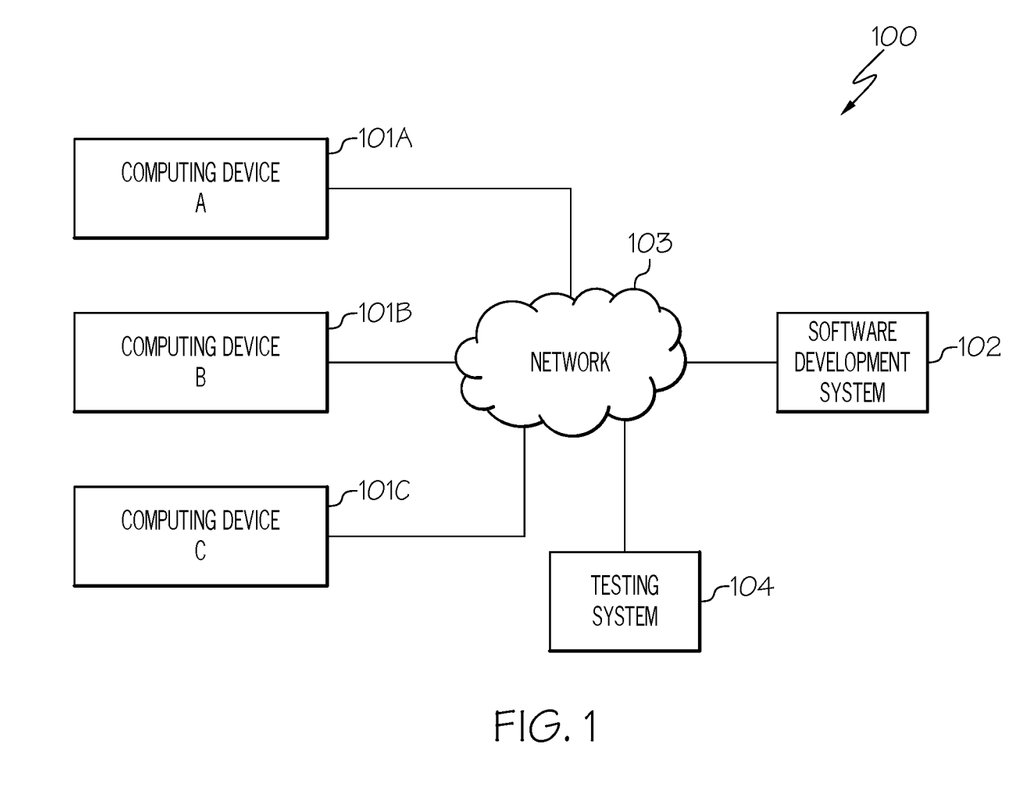
FIG. 1 illustrates a communication system for practicing the principles of the present disclosure in accordance with an embodiment of the present disclosure.

Referring now to the Figures in detail, FIG. 1 illustrates an embodiment of the present disclosure of a communication system 100 for practicing the principles of the present disclosure. Communication system 100 includes computing devices 101A-101C (identified as "Computing Device A," "Computing Device B," and "Computing Device C," respectively, in FIG. 1) connected to a software development system 102 via a network 103. Computing devices 101A-101C may collectively or individually be referred to as computing devices 101 or computing device 101, respectively. It is noted that both computing devices 101 and the users of computing devices 101 may be identified with element number 101.

Computing device 101 may be any type of computing device (e.g., portable computing unit, Personal Digital Assistant (PDA), laptop computer, mobile device, tablet personal computer, smartphone, mobile phone, navigation device, gaming unit, desktop computer system, workstation, Internet appliance and the like) configured with the capability of connecting to network 103 and consequently communicating with other computing devices 101 and software development system 102. It is noted that both computing device 101 and the user of computing device 101 may be identified with element number 101.

Software development system 102 is a system utilized, such as by software developers, in the process of creating, designing, deploying and supporting software. Examples of such software development systems include, but not limited to, RAD Studio®, Embold®, Collaborator®, Studio 3T®, NetBeans®, Zend Studio®, Microsoft® Expression Studio, etc.

In one embodiment, using software development system 102, software developers develop software products to be tested, such as being tested to determine if the software products satisfy the users' best experiences with respect to the functional and non-functional aspects of the software products.

Network 103 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present disclosure.

System 100 further includes a testing system 104 interconnected with computing devices 101 and software development system 102 via network 103. In one embodiment, testing system 104 is configured to test software applications, such as during the testing stage of the software product development process, to determine if the software applications satisfy the users' best experiences with respect to the functional and non-functional aspects of the software applications. In one embodiment, such software applications are in the process of being developed by software developers using software development system 102. In one embodiment, such software applications are accessed from software development system 102 to be tested by testing system 104. In one embodiment, user interactions with functional and non-functional aspects of software applications are monitored by testing system 104. In one embodiment, such information is used to populate "user experience profiles" generated by testing system 104. A "user experience" profile, as used herein, refers to a profile that includes data pertaining to a user's perception of utility, ease of use and efficiency in interacting with the functional and non-functional aspects of the software applications. For example, such data may include the user's experience in connection with interacting with a window, a menu, an icon, a widget, a table, a cursor, a pointer, an insertion point, etc. Such data may include information, such as the speed in which the table was populated, the number of steps performed in resizing a window or selecting an object from a menu, the amount of time it takes a user to move the cursor or pointer from one position to another position using user controls, such as a mouse, touch pad or similar input device, the amount of time it takes a user to identify the insertion point, such as the location at which text is inserted, etc.

In one embodiment, testing system 104 utilizes such user experience profiles to identify the best user experience in connection with specific functional and non-functional aspects of the software application (e.g., populating a drop-down menu). For example, out of the user experience profiles examined by testing system 104, it may be determined that a drop-down menu of ten entries was populated at the fastest time of 1 millisecond. As a result, it may be deemed that the best user experience corresponds to populating a drop-down menu of ten entries at 1 millisecond. A "best user experience," as used herein, refers to the most effective or desirable interaction with a functional or non-functional aspect of the software application, such as undergoing an interaction with a functional or non-functional aspect of the software application in the least amount of time.

Upon identifying a best user experience in connection with specific functional and non-functional aspects of the software application, testing system 104 is further configured to create "virtual users" to correspond to a best user experience for a particular functional or non-functional aspect of the software application under test. A "virtual user," as used herein, refers to a virtual representation of the user whose best user experience will be represented by the virtual user. "Virtual representation," as used herein, refers to symbolizing a real user via the use of the user's best user experience that will be used to test the software application under test by the virtual user.

In one embodiment, testing system 104 tests the software application using the virtual users to determine if the functional and non-functional aspects of the software application meet the users' best experiences as discussed in greater detail below.

A description of the software components of testing system 104 used for testing a software application using the users' best experiences in connection with the functional and non-functional aspects of the software application under test is provided below in connection with FIG. 2. A description of the hardware configuration of testing system 104 is provided further below in connection with FIG. 3.

System 100 is not to be limited in scope to any one particular network architecture. System 100 may include any number of computing devices 101, software development systems 102, networks 103 and testing systems 104.

A discussion regarding the software components used by testing system 104 to perform testing of a software application using the users' best experiences in connection with the functional and non-functional aspects of the software application under test is provided below in connection with FIG. 2

Figure 2:
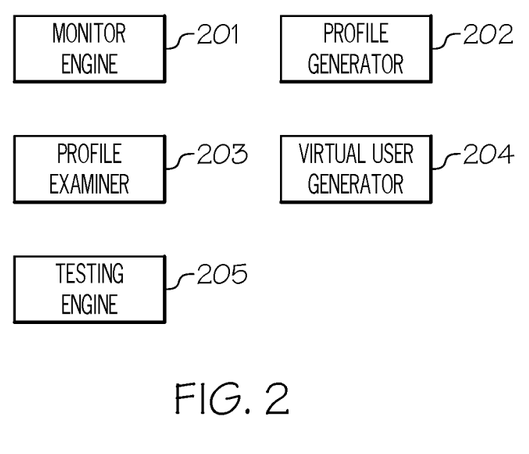
FIG. 2 is a diagram of the software components used by the testing system to perform testing of a software application using the users' best experiences in connection with the functional and non-functional aspects of the software application under test in accordance with an embodiment of the present disclosure.

FIG. 2 is a diagram of the software components used by testing system 104 (FIG. 1) to perform testing of a software application using the users' best experiences in connection with the functional and non-functional aspects of the software application under test in accordance with an embodiment of the present disclosure.

Referring to FIG. 2, in conjunction with FIG. 1, testing system 104 includes a monitor engine 201 configured to monitor users' interactions (interactions of the users of computing devices 101) with the functional and non-functional aspects of the software applications, such as the software applications being developed by the software developers using software development system 102. "Functional" aspects of the software applications, as used herein, refer to the requirements that the software must perform. For example, such functional aspects may include the following types of requirements: transaction handling, business rules, certification requirements, reporting requirements, administrative functions, authorization levels, audit tracking, external interfaces, etc.

"Non-functional" aspects of the software applications, as used herein, specify how the software application achieves such requirements. For example, the non-functional aspects specify quality attributes of the software, scalability, capacity, maintainability, performance (e.g., response time), portability, security, availability, reliability, recoverability, serviceability, etc.

As discussed above, user interactions with the functional and non-functional aspects of the software applications are monitored by monitor engine 201. Examples of such user interactions include interacting with a window, a menu, an icon, a widget, a table, a cursor, a pointer, an insertion point, etc. by the user (e.g., user of computing device 101). Data collected from such monitored user interactions may include information, such as the speed in which the table was populated, the number of steps performed in resizing a window or selecting an object from a menu, the amount of time it takes a user to move the cursor or pointer from one position to another position using user controls, such as a mouse, touch pad or similar input device, the amount of time it takes a user to identify the insertion point, such as the location at which text is inserted, etc.

In one embodiment, monitor engine 201 utilizes user behavior analytics in connection with monitoring users' interactions with the functional and non-functional aspects of the software applications. "User behavior analytics," as used herein, refers to collecting, combining and analyzing quantitative and qualitative user data to understand how users interact with the functional and non-functional aspects of the software product and why. In one embodiment, such user data may be collected by monitor engine 201 via session recordings, which are renderings of real user engagement, such as clicks, taps and scrolling, which can be reviewed by an expert to learn the user's experience in connection with interacting with the functional and non-functional aspects of the software product, such as the time duration in moving the cursor five inches across the computer screen. In one embodiment, session recording occurs by installing an application, such as on computing device 101, to record the computer screen when the user (e.g., user of computing device 101) is interacting with a functional or non-functional aspect of the software product. Such a session recording is then sent to monitor engine 201 of testing system 104. In one embodiment, the session recording is analyzed by an expert to identify the user's interactions with the functional and non-functional aspects of the software application.

In one embodiment, heat maps may be utilized by monitor engine 201 to identify the user's interactions with the functional and non-functional aspects of the software product, such as where the user moves the mouse or where the user clicks (or in the case of a mobile device, where the user taps, swipes or scrolls), as well as information about such interactions, such as a deeper color to indicate a longer interaction (e.g., longer time movement of the mouse).

In another embodiment, surveys, such as onsite surveys, may be utilized by monitor engine 201 to collect personal responses from users (e.g., users of computing devices 101) as to what functional or non-functional aspects of the software product are working for them and which are not. In one embodiment, monitor engine 201 utilizes feedback widgets to obtain feedback regarding the user's experience in connection with the functional and non-functional aspects of the software product, such as aspects they liked and did not like as well as why such aspects were liked and not liked. In one embodiment, feedback widgets are installed on computing device 101 to enable the user of computing device 101 to provide feedback regarding the user's experience in connection with the functional and non-functional aspects of the software product. Such feedback is then provided to monitor engine 201. "Manual textual feedback," as used herein, includes feedback from such widgets as well as feedback from surveys.

Examples of software tools utilized by monitor engine 201 to obtain such user behavior analytics include, but not limited to, Mixpanel™, Amplitude®, Heap®, FullStory®, Sherlock, Tableau®, Dynatrace®, etc.

In another embodiment, monitor engine 201 monitors users' interactions with the functional and non-functional aspects of the software applications via log collection and analysis. Log analysis is the process of reviewing, interpreting and understanding log files. In one embodiment, log files may be generated on computing device 101 that contain information about the user's interactions with the functional and non-functional aspects of the software applications, such as software applications developed by software developers using software development system 102. In one embodiment, log files are streamed from computing device 101 to monitor engine 201 or they may be stored in files on computing device 101 for later review by monitor engine 201. In one embodiment, monitor engine 201 utilizes various software tools (e.g., Sematext Logs, SolarWinds® Loggly, Splunk, Logentries, Sumo Logic®, ManageEngine® EventLog Analyzer, Papertrail, etc.) for monitoring users' interactions with the functional and non-functional aspects of the software applications via log collection and analysis.

In another embodiment, monitor engine 201 monitors users' interactions with the functional and non-functional aspects of the software applications via file/screenshot capturing. A "screenshot" captures whatever is displayed on the screen, such as the screen of computing device 101, and saves it in an image file. The image file can be transmitted from computing device 101 to monitor engine 201 for analysis. In one embodiment, the screenshot is analyzed by an expert to identify the user's interactions with the functional and non-functional aspects of the software application.

In another embodiment, monitor engine 201 monitors users' interactions with the functional and non-functional aspects of the software applications via a biometric data feed from a wearable device worn by the user of computing device 101, where in one embodiment, computing device 101 represents the wearable device worn by the user. In one embodiment, the biometric data feed includes personal data resulting from the interactions of the functional and/or non-functional aspects of the software application relating to the physical, physiological or behavioral characteristics of individuals. In one embodiment, machine learning may be utilized to determine the "best" user experience (the most effective or desirable interaction with a functional or non-functional aspect of the software application, such as undergoing an interaction with a functional or non-functional aspect of the software application in the least amount of time) based on the user's physical, physiological or behavioral characteristics after the users indicate, such as via a feedback widget, when a best user experience occurs. At the time that the best user experience occurs, the physical, physiological or behavioral characteristics of the user are identified. Over time, a correlation between the physical, physiological or behavioral characteristics of the user and the best user experiences are identified.

In one embodiment, monitor engine 201 uses a machine learning algorithm (e.g., supervised learning) to build a mathematical model based on sample data consisting of physical, physiological or behavioral characteristics of users in connection with the users' best experiences. Such data may be obtained from biometric data feeds as discussed above. Such a data set is referred to herein as the "training data" which is used by the machine learning algorithm to make predictions or decisions without being explicitly programmed to perform the task. In one embodiment, the training data consists of physical, physiological or behavioral characteristics of users in connection with the users' best experiences. The algorithm iteratively makes predictions on the training data as to the users' best experiences in connection with the physical, physiological or behavioral characteristics of the users. Examples of such supervised learning algorithms include nearest neighbor, Naïve Bayes, decision trees, linear regression, support vector machines and neural networks.

In one embodiment, the mathematical model (machine learning model) corresponds to a classification model trained to predict the users' best experiences in connection with the physical, physiological or behavioral characteristics of the users.

Testing system 104 further includes a profile generator 202 configured to generate "user experience profiles" for the monitored users (e.g., users of computing devices 101). A "user experience" profile, as used herein, refers to a profile that includes data pertaining to a user's perception of utility, ease of use and efficiency in interacting with the functional and non-functional aspects of the software applications. In one embodiment, such data may be obtained from the monitored users' interactions by monitor engine 201. For example, such data may include the user's experience in connection with interacting with a window, a menu, an icon, a widget, a table, a cursor, a pointer, an insertion point, etc. Such data may include information, such as the speed in which the table was populated, the number of steps performed in resizing a window or selecting an object from a menu, the amount of time it takes a user to move the cursor or pointer from one position to another position using user controls, such as a mouse, touch pad or similar input device, the amount of time it takes a user to identify the insertion point, such as the location at which text is inserted, etc.

In one embodiment, user experience profiles correspond to data structures, which are stored in a storage device (e.g., memory, disk unit) of testing system 104. In one embodiment, such user experience profiles include functional and non-functional aspects (e.g., window, widget, menu, table) along with the user's experience (e.g., time duration, number of steps) in connection with interacting with such functional and non-functional aspects.

In one embodiment, user experience profiles include the specific functional and non-functional aspects (e.g., pull-down menu) of the software application as well as the interaction data with respect to such an aspect (e.g., speed at which the pull-down menu containing ten entries was populated, number of steps to select an entry in the pull-down menu, etc.), where such information was obtained by monitor engine 201.

In one embodiment, profile generator 202 generates a user experience profile for each particular user (e.g., user of computing device 101) whose interactions were monitored by monitor engine 201.

Furthermore, testing system 104 includes a profile examiner 203 configured to identify the best user experience out of the generated user experience profiles in connection with specific functional and non-functional aspects of the software applications (e.g., populating a drop-down menu), whose interactions thereof by the users (e.g., users of computing devices 101) were monitored by monitor engine 201. That is, profile examiner 203 examines the user experience profiles generated by profile generator 202 to identify the best user experience in connection with specific functional and non-functional aspects of the software applications. For example, out of the user experience profiles examined by profile examiner 203, it may be determined that a drop-down menu of ten entries was populated at the fastest time of 1 millisecond. As a result, it may be deemed that the best user experience corresponds to populating a drop-down menu of ten entries at 1 millisecond. A "best user experience," as used herein, refers to the most effective or desirable interaction with a functional or non-functional aspect of the software application, such as undergoing an interaction with a functional or non-functional aspect of the software application in the least amount of time.

In one embodiment, profile examiner 203 utilizes natural language processing to identify a functional or non-functional aspect discussed in the user experience profile. In one embodiment, such functional or non-functional aspects are identified by identifying keywords (e.g., pull-down menu) that correspond to such functional or non-functional aspects, where such keywords (e.g., widget) are listed in a data structure (e.g., table). In one embodiment, such a data structure is stored in a storage device (e.g., memory, disk unit) of testing system 104.

In one embodiment, profile examiner 203 identifies the user experience associated with such identified functional or non-functional aspects based on identifying the data (e.g., time, number of steps) associated with such functional and non-functional aspects stored in the user experience profiles. For example, in a user's experience profile, the non-functional aspect of populating a pull-down menu of ten items may be associated with the user's experience in connection with interacting with such a non-functional aspect (e.g., 1 millisecond to populate the pull-down menu of ten items).

In one embodiment, for each unique functional or non-functional aspect of a software application identified by profile examiner 203, profile examiner 203 identifies all of the users' experiences in connection with interacting with such a functional or non-functional aspect of a software application based on examining all of the user experience profiles generated by profile generator 202. Out of these identified users' experiences, the "best" user experience is identified, such as corresponding to the shortest time or the least number of steps that are used in connection with interacting with such a functional or non-functional aspect of the software application. In one embodiment, the determination (e.g., least number of steps, shortest time) for what constitutes the "best" user experience in connection with a functional or non-functional aspect of the software application is determined by an expert. In one embodiment, profile examiner 203 determines the "best" user experience based on identifying the determining factor (e.g., least number of steps, shortest time) for identifying the "best" user experience in connection with a particular functional or non-functional aspect of the software application, where such a determining factor is obtained from a data structure (e.g., table) established by an expert. For example, an expert may indicate in the data structure that the determining factor for identifying the "best" user experience in connection with the non-functional aspect of populating a pull-down menu is the least amount of time. Such information may be obtained from the data structure by profile examiner 203 using natural language processing to identify the non-functional aspect (e.g., pull-down menu) as well as the corresponding determining factor for identifying the "best" user experience. In one embodiment, such a data structure is stored in the storage device (e.g., memory, disk unit) of testing system 104.

In one embodiment, profile examiner 203 utilizes software tools, such as Aggregate Profiler, Atlan®, IBM® InfoSphere® Information Analyser, Informatica® Data Explorer, Melissa® Data Profiler, Microsoft® DOCS, SAP BODS, SAS® DataFlux, Talend® Open Studio, etc., to examine/analyze user experience profiles as discussed above.

Testing system 104 further includes a virtual user generator 204 configured to create virtual users having different types of best user experiences (obtained from the best user experiences identified by profile examiner 203) in connection with interacting with different functional and non-functional aspects of the software applications.

A "virtual user," as used herein, refers to a virtual representation of the user whose best user experience will be represented by the virtual user. "Virtual representation," as used herein, refers to symbolizing a real user via the use of the user's best user experience that will be used to test the software application under test by the virtual user.

For example, virtual user generator 204 may create a virtual user to test a software application to determine if the software application satisfies the best user experience in connection with the non-functional aspect of populating a menu of ten items, where such a best user experience is associated with such a created virtual user. In one embodiment, such a best user experience is obtained from the best user experiences identified by profile examiner 203.

In one embodiment, virtual user generator 204 creates a virtual user for each type of best user experience in connection with each functional or non-functional aspect of the software application to be tested. In one embodiment, such best user experiences are obtained from the best user experiences identified by profile examiner 203.

In one embodiment, such virtual users correspond to profiles with instructions for testing the software application to determine if it satisfies the best user experience in connection with each functional or non-functional aspect of the software application to be tested. In one embodiment, virtual user generator 204 utilizes a software tool (e.g., WAPT Pro, Oracle® functional testing visual scripts, OpDesk, etc.) to create such profiles.

Testing system 104 further includes a testing engine 205 configured to test the software application using the virtual users to determine if the functional and non-functional aspects of the software application meet the users' best experiences. For example, testing engine 205 determines if each of the virtual users' best user's experience is satisfied by the software application under test. For instance, the instructions of the virtual user, such as in a profile ("virtual user profile"), may be utilized by testing engine 205 to run a test of the functional or non-functional aspect of the software application in question (the functional or non-functional aspect associated with the virtual user) to determine if it meets the best user's experience of the virtual user. In one embodiment, each of the virtual users associated with different types of functional and non-functional aspects of the software application are utilized to perform the testing of the software application to determine if the software application meets the best user's experience for each of these functional and non-functional aspects. In one embodiment, such virtual user profiles are stored in a storage device (e.g., memory, disk unit) of testing unit 104.

In one embodiment, testing engine 205 identifies any functional and/or non-functional aspect of the software application that fails to satisfy a virtual user's best user's experience. For instance, if the user's best experience as captured by the virtual user is to populate a pull-down menu with ten items in 1 millisecond, and it took the software application under test 2 milliseconds to populate the same pull-down menu, then such a failure will be identified by testing engine 205. In one embodiment, as discussed above, such instructions to populate the same pull-down menu in the software application under test will be provided in the virtual user profile.

In one embodiment, testing engine 205 generates a message indicating which functional and/or non-functional aspects of the software application under test did not satisfy a virtual user's best user experience. Such a message may be utilized by the software developer to correct such deficiencies.

In one embodiment, testing engine 205 utilizes a software tool, such as Selenium®, TestingWhiz, TestComplete®, Ranorex®, Sahi, Watir, Tosca Testsuite®, Katalon Studio®, etc., to test the software application using the virtual users to determine if the functional and non-functional aspects of the software application meet the users' best experiences.

A further description of these and other functions is provided below in connection with the discussion of the method for testing a software application, such as during the testing stage of the software product development process, to determine if the software application satisfies the users' best experiences with respect to the functional and non-functional aspects of the software application.

Prior to the discussion of the method for testing a software application to determine if it satisfies the users' best experiences with respect to the functional and non-functional aspects of the software application, a description of the hardware configuration of testing system 104 (FIG. 1) is provided below in connection with FIG. 3.

Figure 3:
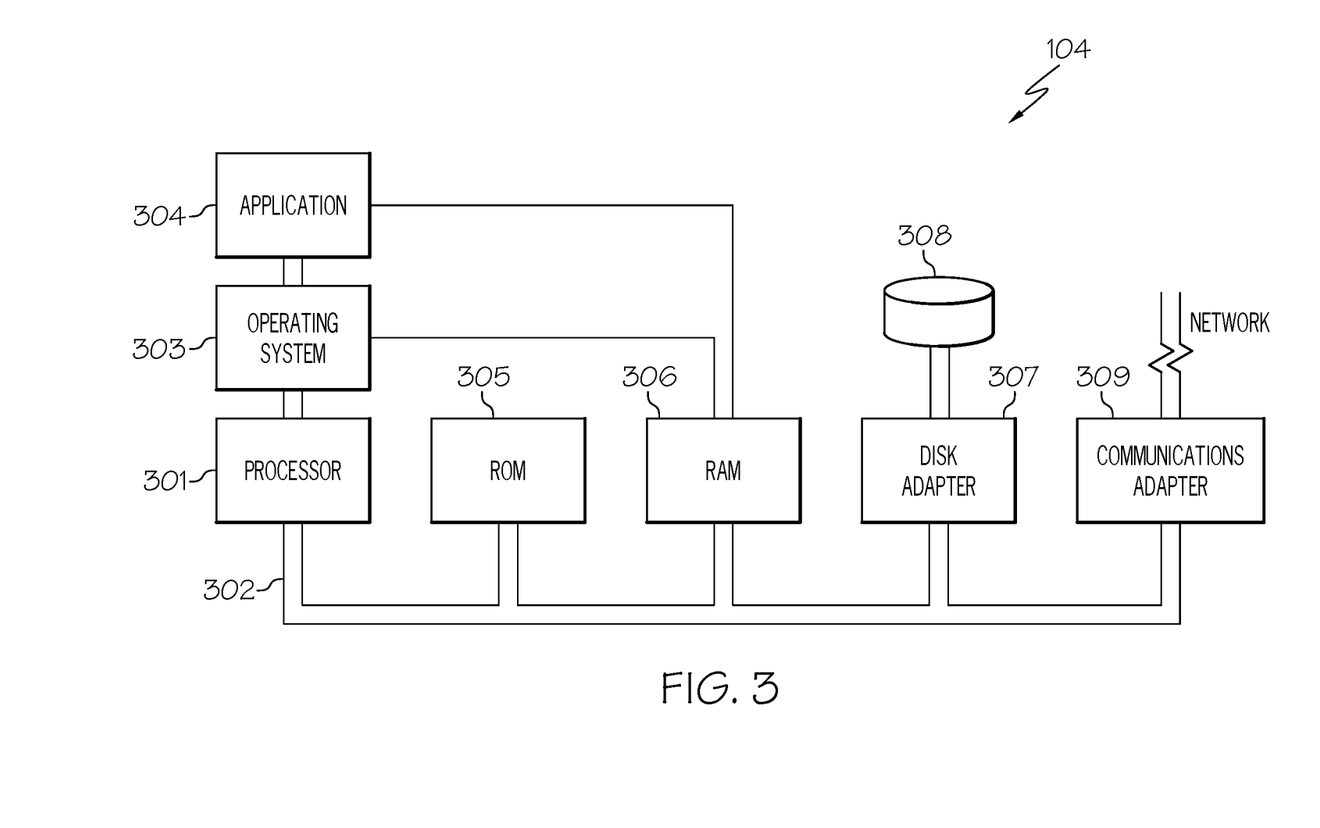
FIG. 3 illustrates an embodiment of the present disclosure of the hardware configuration of the testing system which is representative of a hardware environment for practicing the present disclosure.

Referring now to FIG. 3, FIG. 3 illustrates an embodiment of the present disclosure of the hardware configuration of testing system 104 (FIG. 1) which is representative of a hardware environment for practicing the present disclosure.

Testing system 104 has a processor 301 connected to various other components by system bus 302. An operating system 303 runs on processor 301 and provides control and coordinates the functions of the various components of FIG. 3. An application 304 in accordance with the principles of the present disclosure runs in conjunction with operating system 303 and provides calls to operating system 303 where the calls implement the various functions or services to be performed by application 304. Application 304 may include, for example, monitor engine 201 (FIG. 2), profile generator 202 (FIG. 2), profile examiner 203 (FIG. 2), virtual user generator 204 (FIG. 2) and testing engine 205 (FIG. 2). Furthermore, application 304 may include, for example, a program for testing a software application to determine if it satisfies the users' best experiences with respect to the functional and non-functional aspects of the software application as discussed further below in connection with FIGS. 4-5.

Referring again to FIG. 3, read-only memory ("ROM") 305 is connected to system bus 302 and includes a basic input/output system ("BIOS") that controls certain basic functions of testing system 104. Random access memory ("RAM") 306 and disk adapter 307 are also connected to system bus 302. It should be noted that software components including operating system 303 and application 304 may be loaded into RAM 306, which may be testing system's 104 main memory for execution. Disk adapter 307 may be an integrated drive electronics ("IDE") adapter that communicates with a disk unit 308, e.g., disk drive. It is noted that the program for testing a software application to determine if it satisfies the users' best experiences with respect to the functional and non-functional aspects of the software application, as discussed further below in connection with FIGS. 4-5, may reside in disk unit 308 or in application 304.

Testing system 104 may further include a communications adapter 309 connected to bus 302. Communications adapter 309 interconnects bus 302 with an outside network (e.g., network 103 of FIG. 1) to communicate with other devices, such as computing devices 101 and software development system 102 of FIG. 1.

In one embodiment, application 304 of testing system 104 includes the software components of monitor engine 201, profile generator 202, profile examiner 203, virtual user generator 204 and testing engine 205. In one embodiment, such components may be implemented in hardware, where such hardware components would be connected to bus 302. The functions discussed above performed by such components are not generic computer functions. As a result, testing system 104 is a particular machine that is the result of implementing specific, non-generic computer functions.

In one embodiment, the functionality of such software components (e.g., monitor engine 201, profile generator 202, profile examiner 203, virtual user generator 204 and testing engine 205) of testing system 104, including the functionality for performing software testing, may be embodied in an application specific integrated circuit.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated above, software testing, such as during the testing stage of the software product development process, is an investigation conducted to provide stakeholders with information about the quality of the software product or service under test. Software testing can also provide an objective, independent view of the software to allow the business to appreciate and understand the risks of software implementation. Test techniques include the process of executing a program or application with the intent of finding failures and verifying that the software product is fit for use. Software testing involves the execution of a software component or system component to evaluate one or more properties of interest. In general, these properties indicate the extent to which the component or system under test: meets the requirements that guided its design and development, responds correctly to all kinds of inputs, performs its functions within an acceptable time, is sufficiently usable, can be installed and run in its intended environments and achieves the general result its stakeholders desire. However, such software testing fails to quantify the users' best experiences with the functional and non-functional aspects of the software application under test. For example, when a user gets a drop-down list populated within a millisecond, the user may expect such an experience in populating another drop-down list in the same or in a different application. By not testing software applications to determine if the functional and non-functional aspects of the software application satisfy the users' best experiences, such software applications may not be well received by the targeted users despite performing well during the testing stage of the software product development process due to the poor user experience of the software application. Unfortunately, there is not currently a means for testing software applications with the users' best experiences in connection with the functional and non-functional aspects of the software application under test.

Figure 4:
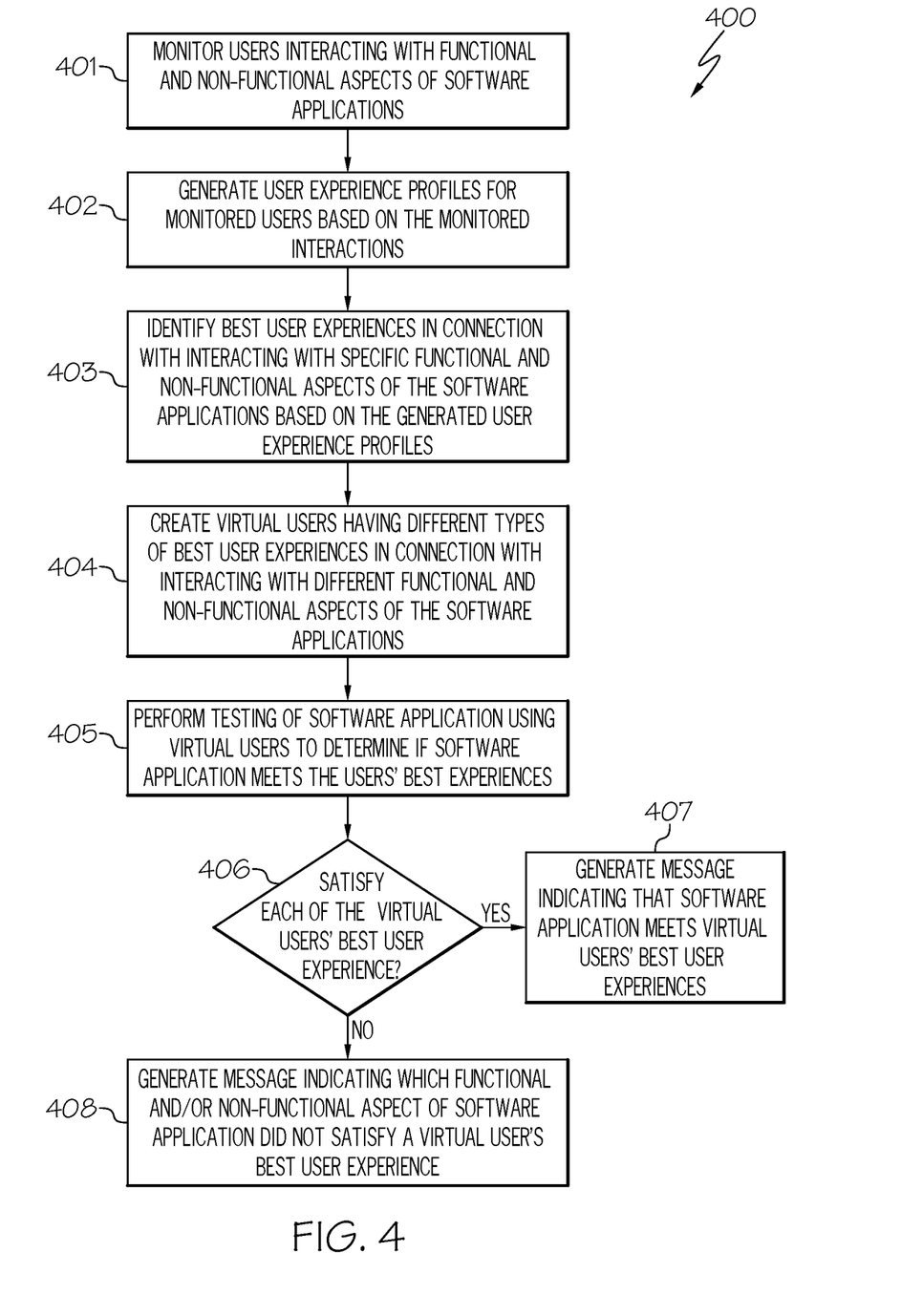
FIG. 4 is a flowchart of a method for testing a software application to determine if it satisfies the users' best experiences with respect to the functional and non-functional aspects of the software application in accordance with an embodiment of the present disclosure.
Figure 5:
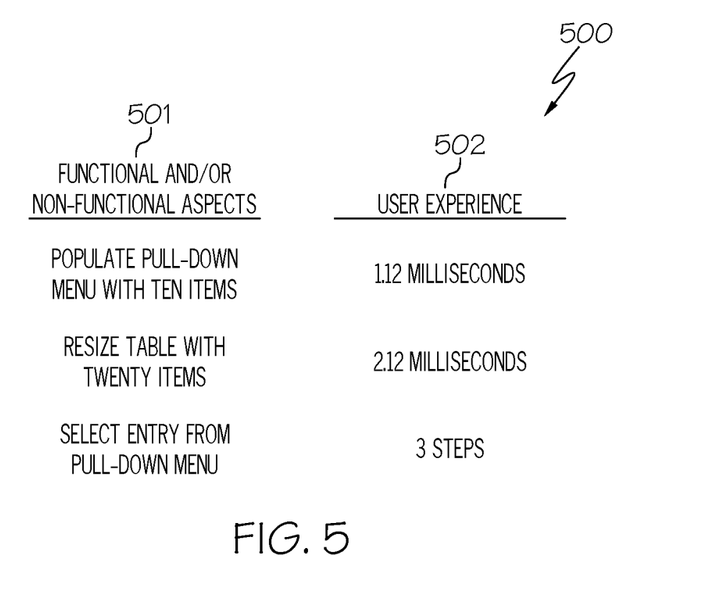
FIG. 5 illustrates an exemplary user experience profile containing information pertaining to the user's experience in connection with the functional and/or non-functional aspects of the software application in accordance with an embodiment of the present disclosure.

The embodiments of the present disclosure provide a means for performing software testing that includes testing the software application to determine if it satisfies the users' best experiences with respect to the functional and non-functional aspects of the software application under test as discussed below in connection with FIGS. 4 and 5. FIG. 4 is a flowchart of a method for testing a software application to determine if it satisfies the users' best experiences with respect to the functional and non-functional aspects of the software application. FIG. 5 illustrates an exemplary user experience profile containing information pertaining to the user's experience in connection with the functional and/or non-functional aspects of the software application.

As stated above, FIG. 4 is a flowchart of a method 400 for testing a software application to determine if it satisfies the users' best experiences with respect to the functional and non-functional aspects of the software application in accordance with an embodiment of the present disclosure.

Referring to FIG. 4, in conjunction with FIGS. 1-3, in step 401, monitor engine 201 of testing system 104 monitors users (e.g., users of computing device 101) interacting with functional and non-functional aspects of software applications, such as software applications being developed by software developers using software development system 102.

As discussed above, "functional" aspects of the software applications, as used herein, refer to the requirements that the software must perform. For example, such functional aspects may include the following types of requirements: transaction handling, business rules, certification requirements, reporting requirements, administrative functions, authorization levels, audit tracking, external interfaces, etc.

"Non-functional" aspects of the software applications, as used herein, specify how the software application achieves such requirements. For example, the non-functional aspects specify quality attributes of the software, scalability, capacity, maintainability, performance (e.g., response time), portability, security, availability, reliability, recoverability, serviceability, etc.

As also discussed above, user interactions with the functional and non-functional aspects of the software applications are monitored by monitor engine 201. Examples of such user interactions include interacting with a window, a menu, an icon, a widget, a table, a cursor, a pointer, an insertion point, etc. by the user (e.g., user of computing device 101). Data collected from such monitored user interactions may include information, such as the speed in which the table was populated, the number of steps performed in resizing a window or selecting an object from a menu, the amount of time it takes a user to move the cursor or pointer from one position to another position using user controls, such as a mouse, touch pad or similar input device, the amount of time it takes a user to identify the insertion point, such as the location at which text is inserted, etc.

In one embodiment, monitor engine 201 utilizes user behavior analytics in connection with monitoring users' interactions with the functional and non-functional aspects of the software applications. "User behavior analytics," as used herein, refers to collecting, combining and analyzing quantitative and qualitative user data to understand how users interact with the functional and non-functional aspects of the software product and why. In one embodiment, such user data may be collected by monitor engine 201 via session recordings, which are renderings of real user engagement, such as clicks, taps and scrolling, which can be reviewed by an expert to learn the user's experience in connection with interacting with the functional and non-functional aspects of the software product, such as the time duration in moving the cursor five inches across the computer screen. In one embodiment, session recording occurs by installing an application, such as on computing device 101, to record the computer screen when the user (e.g., user of computing device 101) is interacting with a functional or non-functional aspect of the software product. Such a session recording is then sent to monitor engine 201 of testing system 104. In one embodiment, the session recording is analyzed by an expert to identify the user's interactions with the functional and non-functional aspects of the software application.

In one embodiment, heat maps may be utilized by monitor engine 201 to identify the user's interactions with the functional and non-functional aspects of the software product, such as where the user moves the mouse or where the user clicks (or in the case of a mobile device, where the user taps, swipes or scrolls), as well as information about such interactions, such as a deeper color to indicate a longer interaction (e.g., longer time movement of the mouse).

In another embodiment, surveys, such as onsite surveys, may be utilized by monitor engine 201 to collect personal responses from users (e.g., users of computing devices 101) as to what functional or non-functional aspects of the software product are working for them and which are not. In one embodiment, monitor engine 201 utilizes feedback widgets to obtain feedback regarding the user's experience in connection with the functional and non-functional aspects of the software product, such as aspects they liked and did not like as well as why such aspects were liked and not liked. In one embodiment, feedback widgets are installed on computing device 101 to enable the user of computing device 101 to provide feedback regarding the user's experience in connection with the functional and non-functional aspects of the software product. Such feedback is then provided to monitor engine 201. "Manual textual feedback," as used herein, includes feedback from such widgets as well as feedback from surveys.

Examples of software tools utilized by monitor engine 201 to obtain such user behavior analytics include, but not limited to, Mixpanel™, Amplitude®, Heap®, FullStory®, Sherlock, Tableau®, Dynatrace®, etc.

In another embodiment, monitor engine 201 monitors users' interactions with the functional and non-functional aspects of the software applications via log collection and analysis. Log analysis is the process of reviewing, interpreting and understanding log files. In one embodiment, log files may be generated on computing device 101 that contain information about the user's interactions with the functional and non-functional aspects of the software applications, such as software applications developed by software developers using software development system 102. In one embodiment, log files are streamed from computing device 101 to monitor engine 201 or they may be stored in files on computing device 101 for later review by monitor engine 201. In one embodiment, monitor engine 201 utilizes various software tools (e.g., Sematext Logs, SolarWinds® Loggly, Splunk, Logentries, Sumo Logic®, ManageEngine® EventLog Analyzer, Papertrail, etc.) for monitoring users' interactions with the functional and non-functional aspects of the software applications via log collection and analysis.

In another embodiment, monitor engine 201 monitors users' interactions with the functional and non-functional aspects of the software applications via file/screenshot capturing. A "screenshot" captures whatever is displayed on the screen, such as the screen of computing device 101, and saves it in an image file. The image file can be transmitted from computing device 101 to monitor engine 201 for analysis. In one embodiment, the screenshot is analyzed by an expert to identify the user's interactions with the functional and non-functional aspects of the software application.

In another embodiment, monitor engine 201 monitors users' interactions with the functional and non-functional aspects of the software applications via a biometric data feed from a wearable device worn by the user of computing device 101, where in one embodiment, computing device 101 represents the wearable device worn by the user. In one embodiment, the biometric data feed includes personal data resulting from the interactions of the functional and/or non-functional aspects of the software application relating to the physical, physiological or behavioral characteristics of individuals. In one embodiment, machine learning may be utilized to determine the "best" user experience (the most effective or desirable interaction with a functional or non-functional aspect of the software application, such as undergoing an interaction with a functional or non-functional aspect of the software application in the least amount of time) based on the user's physical, physiological or behavioral characteristics after the users indicate, such as via a feedback widget, when a best user experience occurs. At the time that the best user experience occurs, the physical, physiological or behavioral characteristics of the user are identified. Over time, a correlation between the physical, physiological or behavioral characteristics of the user and the best user experiences are identified.

In one embodiment, monitor engine 201 uses a machine learning algorithm (e.g., supervised learning) to build a mathematical model based on sample data consisting of physical, physiological or behavioral characteristics of users in connection with the users' best experiences. Such data may be obtained from biometric data feeds as discussed above. Such a data set is referred to herein as the "training data" which is used by the machine learning algorithm to make predictions or decisions without being explicitly programmed to perform the task. In one embodiment, the training data consists of physical, physiological or behavioral characteristics of users in connection with the users' best experiences. The algorithm iteratively makes predictions on the training data as to the users' best experiences in connection with the physical, physiological or behavioral characteristics of the users. Examples of such supervised learning algorithms include nearest neighbor, Naïve Bayes, decision trees, linear regression, support vector machines and neural networks.

In one embodiment, the mathematical model (machine learning model) corresponds to a classification model trained to predict the users' best experiences in connection with the physical, physiological or behavioral characteristics of the users.

In step 402, profile generator 202 of testing system 104 generates user experience profiles for the monitored users based on the monitored interactions.

As discussed above, a "user experience" profile, as used herein, refers to a profile that includes data pertaining to a user's perception of utility, ease of use and efficiency in interacting with the functional and non-functional aspects of the software applications. In one embodiment, such data may be obtained from the monitored users' interactions by monitor engine 201. For example, such data may include the user's experience in connection with interacting with a window, a menu, an icon, a widget, a table, a cursor, a pointer, an insertion point, etc. Such data may include information, such as the speed in which the table was populated, the number of steps performed in resizing a window or selecting an object from a menu, the amount of time it takes a user to move the cursor or pointer from one position to another position using user controls, such as a mouse, touch pad or similar input device, the amount of time it takes a user to identify the insertion point, such as the location at which text is inserted, etc.

In one embodiment, user experience profiles correspond to data structures, which are stored in a storage device (e.g., memory 305, disk unit 308) of testing system 104. In one embodiment, such user experience profiles include functional and non-functional aspects (e.g., window, widget, menu, table) along with the user's experience (e.g., time duration, number of steps) in connection with interacting with such functional and non-functional aspects.

In one embodiment, user experience profiles include the specific functional and non-functional aspects (e.g., pull-down menu) of the software application as well as the interaction data with respect to such an aspect (e.g., speed at which the pull-down menu containing ten entries was populated, number of steps to select an entry in the pull-down menu, etc.), where such information was obtained by monitor engine 201.

In one embodiment, profile generator 202 generates a user experience profile for each particular user (e.g., user of computing device 101) whose interactions were monitored by monitor engine 201.

An illustration of an exemplary user experience profile containing information pertaining to the user's experience in connection with the functional and/or non-functional aspects of the software application is discussed below in connection with FIG. 5.

Referring to FIG. 5, FIG. 5 illustrates an exemplary user experience profile containing information pertaining to the user's experience in connection with the functional and/or non-functional aspects of the software application in accordance with an embodiment of the present disclosure.

As shown in FIG. 5, user experience profile 500 includes a listing of the functional and/or non-functional aspects 501 along with the corresponding user experience 502. For example, the non-functional aspect of populating a pull-down menu with ten items has a corresponding user experience of 1.12 milliseconds. In another example, the non-functional aspect of resizing a table with twenty items has a corresponding user experience of 2.12 milliseconds. In a further example, the non-functional aspect of selecting an entry from the pull-down menu has a corresponding user experience of 3 steps.

Returning to FIG. 4, in conjunction with FIGS. 1-3 and 5, in step 403, profile examiner 203 of testing system 104 identifies the best user experience in connection with interacting with specific functional and non-functional aspects of the software applications based on the generated user experience profiles.

As stated above, profile examiner 203 is configured to identify the best user experience out of the generated user experience profiles in connection with specific functional and non-functional aspects of the software applications (e.g., populating a drop-down menu), whose interactions thereof by the users (e.g., users of computing devices 101) were monitored by monitor engine 201. That is, profile examiner 203 examines the user experience profiles generated by profile generator 202 to identify the best user experience in connection with specific functional and non-functional aspects of the software applications. For example, out of the user experience profiles examined by profile examiner 203, it may be determined that a drop-down menu of ten entries was populated at the fastest time of 1 millisecond. As a result, it may be deemed that the best user experience corresponds to populating a drop-down menu of ten entries at 1 millisecond. A "best user experience," as used herein, refers to the most effective or desirable interaction with a functional or non-functional aspect of the software application, such as undergoing an interaction with a functional or non-functional aspect of the software application in the least amount of time.

In one embodiment, profile examiner 203 utilizes natural language processing to identify a functional or non-functional aspect discussed in the user experience profile. In one embodiment, such functional or non-functional aspects are identified by identifying keywords (e.g., pull-down menu) that correspond to such functional or non-functional aspects, where such keywords (e.g., widget) are listed in a data structure (e.g., table). In one embodiment, such a data structure is stored in a storage device (e.g., memory 305, disk unit 308) of testing system 104.

In one embodiment, profile examiner 203 identifies the user experience associated with such identified functional or non-functional aspects based on identifying the data (e.g., time, number of steps) associated with such functional and non-functional aspects stored in the user experience profiles. For example, in a user's experience profile, the non-functional aspect of populating a pull-down menu of ten items may be associated with the user's experience in connection with interacting with such a non-functional aspect (e.g., 1 millisecond to populate the pull-down menu of ten items).

In one embodiment, for each unique functional or non-functional aspect of a software application identified by profile examiner 203, profile examiner 203 identifies all of the users' experiences in connection with interacting with such a functional or non-functional aspect of a software application based on examining all of the user experience profiles generated by profile generator 202. Out of these identified users' experiences, the "best" user experience is identified, such as corresponding to the shortest time or the least number of steps that are used in connection with interacting with such a functional or non-functional aspect of the software application. In one embodiment, the determination (e.g., least number of steps, shortest time) for what constitutes the "best" user experience in connection with a functional or non-functional aspect of the software application is determined by an expert. In one embodiment, profile examiner 203 determines the "best" user experience based on identifying the determining factor (e.g., least number of steps, shortest time) for identifying the "best" user experience in connection with a particular functional or non-functional aspect of the software application, where such a determining factor is obtained from a data structure (e.g., table) established by an expert. For example, an expert may indicate in the data structure that the determining factor for identifying the "best" user experience in connection with the non-functional aspect of populating a pull-down menu is the least amount of time. Such information may be obtained from the data structure by profile examiner 203 using natural language processing to identify the non-functional aspect (e.g., pull-down menu) as well as the corresponding determining factor for identifying the "best" user experience. In one embodiment, such a data structure is stored in the storage device (e.g., memory 305, disk unit 308) of testing system 104.

In one embodiment, profile examiner 203 utilizes software tools, such as Aggregate Profiler, Atlan®, IBM® InfoSphere® Information Analyser, Informatica® Data Explorer, Melissa® Data Profiler, Microsoft® DOCS, SAP BODS, SAS® DataFlux, Talend® Open Studio, etc., to examine/analyze user experience profiles as discussed above.

In step 404, virtual user generator 204 of testing system 104 creates virtual users having different types of best user experiences (obtained from the identified best user experiences) in connection with interacting with different functional and non-functional aspects of the software applications.

As discussed above, a "virtual user," as used herein, refers to a virtual representation of the user whose best user experience will be represented by the virtual user. "Virtual representation," as used herein, refers to symbolizing a real user via the use of the user's best user experience that will be used to test the software application under test by the virtual user.

For example, virtual user generator 204 may create a virtual user to test a software application to determine if the software application satisfies the best user experience in connection with the non-functional aspect of populating a menu of ten items, where such a best user experience is associated with such a created virtual user. In one embodiment, such a best user experience is obtained from the best user experiences identified by profile examiner 203.

In one embodiment, virtual user generator 204 creates a virtual user for each type of best user experience in connection with each functional or non-functional aspect of the software application to be tested. In one embodiment, such best user experiences are obtained from the best user experiences identified by profile examiner 203.

In one embodiment, such virtual users correspond to profiles with instructions for testing the software application to determine if it satisfies the best user experience in connection with each functional or non-functional aspect of the software application to be tested. In one embodiment, virtual user generator 204 utilizes a software tool (e.g., WAPT Pro, Oracle® functional testing visual scripts, OpDesk, etc.) to create such profiles.

In step 405, testing engine 205 of testing system 104 performs the testing of a software application using the virtual users to determine if the software application meets the users' best experiences.

For example, testing engine 205 determines if each of the virtual users' best user's experience is satisfied by the software application under test. For instance, the instructions of the virtual user, such as in a profile ("virtual user profile"), may be utilized by testing engine 205 to run a test of the functional or non-functional aspect of the software application in question (the functional or non-functional aspect associated with the virtual user) to determine if it meets the best user's experience of the virtual user. In one embodiment, each of the virtual users associated with different types of functional and non-functional aspects of the software application are utilized to perform the testing of the software application to determine if the software application meets the best user's experience for each of these functional and non-functional aspects. In one embodiment, such virtual user profiles are stored in a storage device (e.g., memory 305, disk unit 308) of testing unit 104.

As discussed above, in one embodiment, testing engine 205 identifies any functional and/or non-functional aspect of the software application that fails to satisfy a virtual user's best user's experience. For instance, if the user's best experience as captured by the virtual user is to populate a pull-down menu with ten items in 1 millisecond, and it took the software application under test 2 milliseconds to populate the same pull-down menu, then such a failure will be identified by testing engine 205. In one embodiment, as discussed above, such instructions to populate the same pull-down menu in the software application under test will be provided in the virtual user profile.

In one embodiment, testing engine 205 utilizes a software tool, such as Selenium®, TestingWhiz, TestComplete®, Ranorex®, Sahi, Watir, Tosca Testsuite®, Katalon Studio®, etc., to test the software application using the virtual users to determine if the functional and non-functional aspects of the software application meet the users' best experiences.

In step 406, a determination is made by testing engine 205 of testing system 104 as to whether each of the virtual users' best user experience is satisfied by the software application under test.

If each of the virtual users' best user experience is satisfied by the software application under test, then, in step 407, testing engine 205 of testing system 104 generates a message indicating that the software application meets the virtual users' best user experiences. In one embodiment, such a message may be in the form of a text message, an email message, an automated telephone call, etc., that is used to contact a user, such as a software developer.

If, however, each of the virtual users' best user experience was not satisfied by the software application under test, then, in step 408, testing engine 205 of testing system 104 generates a message indicating which functional and/or non-functional aspects of the software application under test did not satisfy a virtual user's best user experience. In one embodiment, such a message may be in the form of a text message, an email message, an automated telephone call, etc., that is used to contact a user, such as a software developer. In one embodiment, such a message may be utilized by the software developer to correct such deficiencies.

In this manner, software applications may be tested to determine if the software applications satisfy the users' best experiences with respect to the functional and non-functional aspects of the software application under test.

Furthermore, the principles of the present disclosure improve the technology or technical field involving software testing. As discussed above, software testing, such as during the testing stage of the software product development process, is an investigation conducted to provide stakeholders with information about the quality of the software product or service under test. Software testing can also provide an objective, independent view of the software to allow the business to appreciate and understand the risks of software implementation. Test techniques include the process of executing a program or application with the intent of finding failures and verifying that the software product is fit for use. Software testing involves the execution of a software component or system component to evaluate one or more properties of interest. In general, these properties indicate the extent to which the component or system under test: meets the requirements that guided its design and development, responds correctly to all kinds of inputs, performs its functions within an acceptable time, is sufficiently usable, can be installed and run in its intended environments and achieves the general result its stakeholders desire. However, such software testing fails to quantify the users' best experiences with the functional and non-functional aspects of the software application under test. For example, when a user gets a drop-down list populated within a millisecond, the user may expect such an experience in populating another drop-down list in the same or in a different application. By not testing software applications to determine if the functional and non-functional aspects of the software application satisfy the users' best experiences, such software applications may not be well received by the targeted users despite performing well during the testing stage of the software product development process due to the poor user experience of the software application. Unfortunately, there is not currently a means for testing software applications with the users' best experiences in connection with the functional and non-functional aspects of the software application under test.

Embodiments of the present disclosure improve such technology by monitoring user interactions with the functional and non-functional aspects of the software applications. "Functional" aspects of the software applications, as used herein, refer to the requirements that the software must perform. For example, such functional aspects may include the following types of requirements: transaction handling, business rules, certification requirements, reporting requirements, administrative functions, authorization levels, audit tracking, external interfaces, etc. "Non-functional" aspects of the software applications, as used herein, specify how the software application achieves such requirements. For example, the non-functional aspects specify quality attributes of the software, scalability, capacity, maintainability, performance (e.g., response time), portability, security, availability, reliability, recoverability, serviceability, etc. User experience profiles are then generated for the monitored users based on the monitored interactions. A "user experience" profile, as used herein, refers to a profile that includes data pertaining to a user's perception of utility, ease of use and efficiency in interacting with the functional and non-functional aspects of the software applications. For example, such data may include the user's experience in connection with interacting with a window, a menu, an icon, a widget, a table, a cursor, a pointer, an insertion point, etc. The best user experiences in connection with interacting with specific functional and non-functional aspects of the software applications are then identified based on these generated user experience profiles. For example, out of the generated user experience profiles, it may be determined that a drop-down menu of ten entries was populated at the fastest time of 1 millisecond. As a result, it may be deemed that the best user experience corresponds to populating a drop-down menu of ten entries at 1 millisecond. A "best user experience," as used herein, refers to the most effective or desirable interaction with a functional or non-functional aspect of the software application, such as undergoing an interaction with a functional or non-functional aspect of the software application in the least amount of time. Virtual users having different types of best user experiences (obtained from the identified best user experiences) in connection with interacting with different functional and non-functional aspects of the software applications are created. A "virtual user," as used herein, refers to a virtual representation of the user whose best user experience will be represented by the virtual user. "Virtual representation," as used herein, refers to symbolizing a real user via the use of the user's best user experience that will be used to test the software application under test by the virtual user. For example, a virtual user is created to test a software application to determine if the software application satisfies the best user experience in connection with the non-functional aspect of populating a menu of ten items, where such a best user experience is associated with such a created virtual user. The software application is then tested using the virtual users to determine if the functional and non-functional aspects of the software application satisfy the best user experiences associated with the virtual users. If some of the functional or non-functional aspects of the software application did not satisfy the best user experiences associated with the virtual users, then a message may be generated indicating which functional and/or non-functional aspects of the software application under test did not satisfy a virtual user's best user experience. Such a message may be utilized by the software developer to correct such deficiencies. In this manner, software applications may be tested to determine if the software applications satisfy the users' best experiences with respect to the functional and non-functional aspects of the software application under test. Furthermore, in this manner, there is an improvement in the technical field involving software testing.

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for testing a software application, the method comprising:
    monitoring users interacting with functional and non-functional aspects of software applications;
    generating user experience profiles for said monitored users based on said monitored interactions;
    identifying best user experiences in connection with interacting with specific functional and non-functional aspects of said software applications based on said generated user experience profiles;
    creating virtual users having different types of best user experiences, which are obtained from said identified best user experiences, in connection with interacting with different functional and non-functional aspects of said software applications; and
    performing testing of said software application using said virtual users to determine if functional and non-functional aspects of said software application satisfy said best user experiences associated with said virtual users.

2. The method as recited in claim 1, wherein said generated user experience profiles comprise data pertaining to a user's perception of utility, ease of use and efficiency in interacting with said software applications.

3. The method as recited in claim 1, wherein each of said created virtual users is utilized to determine if a specific functional or non-functional aspect of said software application meets a best user experience associated with said specific functional or non-functional aspect of said software application.

4. The method as recited in claim 1 further comprising:
    generating a message indicating that said software application meets said virtual users' best user experiences in response to said software application satisfying each of said virtual users' best user experience.

5. The method as recited in claim 1 further comprising:
    generating a message indicating which functional or non-functional aspect of said software application did not meet a virtual user's best user experience in response to said software application not meeting said virtual user's best user experience in connection with said functional or non-functional aspect of said software application.

6. The method as recited in claim 1, wherein said interactions with said functional and non-functional aspects of said software applications comprise interactions selected from the group consisting of: a window, a menu, an icon, a widget, a tab, a cursor, a pointer, and an insertion point.

7. The method as recited in claim 1, wherein said user interactions are monitored via application logs and manual textual feedback.

8. A computer program product for testing a software application, the computer program product comprising one or more computer readable storage mediums having program code embodied therewith, the program code comprising programming instructions for:
    monitoring users interacting with functional and non-functional aspects of software applications;
    generating user experience profiles for said monitored users based on said monitored interactions;
    identifying best user experiences in connection with interacting with specific functional and non-functional aspects of said software applications based on said generated user experience profiles;
    creating virtual users having different types of best user experiences, which are obtained from said identified best user experiences, in connection with interacting with different functional and non-functional aspects of said software applications; and
    performing testing of said software application using said virtual users to determine if functional and non-functional aspects of said software application satisfy said best user experiences associated with said virtual users.

9. The computer program product as recited in claim 8, wherein said generated user experience profiles comprise data pertaining to a user's perception of utility, ease of use and efficiency in interacting with said software applications.

10. The computer program product as recited in claim 8, wherein each of said created virtual users is utilized to determine if a specific functional or non-functional aspect of said software application meets a best user experience associated with said specific functional or non-functional aspect of said software application.

11. The computer program product as recited in claim 8, wherein the program code further comprises the programming instructions for:
   generating a message indicating that said software application meets said virtual users' best user experiences in response to said software application satisfying each of said virtual users' best user experience.

12. The computer program product as recited in claim 8, wherein the program code further comprises the programming instructions for:
   generating a message indicating which functional or non-functional aspect of said software application did not meet a virtual user's best user experience in response to said software application not meeting said virtual user's best user experience in connection with said functional or non-functional aspect of said software application.

13. The computer program product as recited in claim 8, wherein said interactions with said functional and non-functional aspects of said software applications comprise interactions selected from the group consisting of: a window, a menu, an icon, a widget, a tab, a cursor, a pointer, and an insertion point.

14. The computer program product as recited in claim 8, wherein said user interactions are monitored via application logs and manual textual feedback.

15. A system, comprising:
   a memory for storing a computer program for testing a software application; and
   a processor connected to said memory, wherein said processor is configured to execute program instructions of the computer program comprising:
      monitoring users interacting with functional and non-functional aspects of software applications;
      generating user experience profiles for said monitored users based on said monitored interactions;
      identifying best user experiences in connection with interacting with specific functional and non-functional aspects of said software applications based on said generated user experience profiles;
      creating virtual users having different types of best user experiences, which are obtained from said identified best user experiences, in connection with interacting with different functional and non-functional aspects of said software applications; and
      performing testing of said software application using said virtual users to determine if functional and non-functional aspects of said software application satisfy said best user experiences associated with said virtual users.

16. The system as recited in claim 15, wherein said generated user experience profiles comprise data pertaining to a user's perception of utility, ease of use and efficiency in interacting with said software applications.

17. The system as recited in claim 15, wherein each of said created virtual users is utilized to determine if a specific functional or non-functional aspect of said software application meets a best user experience associated with said specific functional or non-functional aspect of said software application.

18. The system as recited in claim 15, wherein the program instructions of the computer program further comprise:
   generating a message indicating that said software application meets said virtual users' best user experiences in response to said software application satisfying each of said virtual users' best user experience.

19. The system as recited in claim 15, wherein the program instructions of the computer program further comprise:
   generating a message indicating which functional or non-functional aspect of said software application did not meet a virtual user's best user experience in response to said software application not meeting said virtual user's best user experience in connection with said functional or non-functional aspect of said software application.

20. The system as recited in claim 15, wherein said interactions with said functional and non-functional aspects of said software applications comprise interactions selected from the group consisting of: a window, a menu, an icon, a widget, a tab, a cursor, a pointer, and an insertion point.

* * * * *